INVENTOR.
WILLIAM W. BELL, JR.

Sept. 15, 1970  W. W. BELL, JR  3,528,489
ABSORPTION HEATING AND COOLING SYSTEMS
Filed Dec. 18, 1968  2 Sheets-Sheet 2

INVENTOR.
WILLIAM W. BELL, JR.
BY Frank N. Decker Jr
ATTORNEY.

United States Patent Office 3,528,489
Patented Sept. 15, 1970

3,528,489
ABSORPTION HEATING AND COOLING SYSTEMS
William W. Bell, Jr., Marcellus, N.Y., assignor to Carrier Corporation, Syracuse, N.Y., a corporation of Delaware
Filed Dec. 18, 1968, Ser. No. 784,723
Int. Cl. F25b 29/00
U.S. Cl. 165—2       14 Claims

ABSTRACT OF THE DISCLOSURE

A heating and cooling system which, in the cooling mode of operation, comprises an absorption refrigeration system including a generator, a condenser, an evaporator, and an absorber. In the heating mode of operation, refrigerant and absorbent solution are mixed to form a heating fluid, which is heated in the generator and circulated through a heat exchanger to provide heat. A liquid filled trap is formed in the refrigerant vapor passage between the generator and the condenser in the heating mode of operation. A generator effluent passage conducts heated liquid from the generator to the heat exchanger and is disposed remotely from the liquid trap so that the liquid in the trap is not in circulation. The liquid in the trap is cooled to provide a lower vapor pressure than the vapor pressure of liquid heated in the generator. The trap also has a condenser side leg having a sufficient vertical elevation to balance any pressure difference between the generator and the condenser during heating by a column of liquid in the trap.

BACKGROUND OF THE INVENTION

Previous heating and cooling system have been devised which employ an absorption refrigeration cooling mode of operation. Generally, such systems have employed a condensation process to provide heating. These systems have presented many problems relating to corrosion, production of noncondensible gases, purging, solidification during operation, freezing when exposed to outdoor temperatures, and ease of changeover from heating to cooling. However, these problems have been largely overcome by the heating and cooling system forming the subject matter of Leonard application Ser. No. 784,724 filed concurrently herewith. In that system, absorbent solution and refrigerant are mixed together to form an antifreeze heating liquid which is heated to a relatively low temperature in the generator and circulated through a suitable heat exchanger to provide heat to a desired location.

A system of the type described has the special advantage of being particularly adaptable to air-cooled operation. In an air-cooled system, the refrigerant condenser is normally exposed to ambient air temperature during both the cooling and heating mode of operation. This fact results in several problems. For example, because the generator is exposed to the condenser pressure, the boiling point of the liquid in the generator on a cold day may be reduced well below that desired for satisfactory heating. For example, a 50% solution of lithium bromide and water at a 20° F. ambient condenser temperature will boil in the generator at about 55° F., which is too low for satisfactory heating. Furthermore, if the solution in the generator is permitted to boil, refrigerant vapor will be driven off and will condense in the condenser. This condensation results in heat being lost from the system uselessly, and may also result in damage to the condenser, if the condensate freezes, which it will at low ambient temperatures. Furthermore, if a desired difference in low temperature between the generator being heated and the condenser exposed to ambient temperature is maintained, there will necessarily also be a substantial pressure difference between the generator and the condenser. This pressure difference can result in the solution from the generator being blown into the condenser resulting in problems of loss of solution from the heating circuit and waste of heat, which would make such an arrangement impractical.

It is consequently a principal feature of this invention to provide a heating apparatus and method of operation which is capable of effectively utilizing a mixture of antifreeze and refrigerant to provide heating under all conditions of operation, such as low ambient temperatures.

SUMMARY OF THE INVENTION

In accordance with this invention, there is provided a heating and cooling system having a generator, a condenser, an evaporator and an absorber connected to provide an absorption refrigeration cooling mode operation. Mode control means is provided to switch from cooling mode operation to heating mode operation by mixing absorbent solution and refrigerant to form a heating fluid having antifreeze properties. The heating fluid is heated in the generator and passed through a generator effluent passage to a heat exchanger in heat exchange with a location to be heated.

The refrigerant vapor passage extending between the generator and the condenser in the cooling mode is provided with a trap which is filled with liquid in the heating mode. The generator effluent passage preferably comprises a portion of the refrigerant vapor passage and is remote from the liquid trap. The liquid in the liquid trap is cooled sufficiently so that it has a vapor pressure lower than the vapor pressure of the heating fluid heated in the generator, thus inhibiting boiling of the refrigerant vapor therefrom. The liquid trap also has a leg on the condenser side thereof having a sufficient vertical height so that the liquid in the trap balances the pressure difference between the condenser and the generator to prevent passage of the liquid to the condenser when the condenser pressure is substantially lower than generator pressure.

DESCRIPTION OF THE PREFERRED EMBODIMENT

Figure 1:
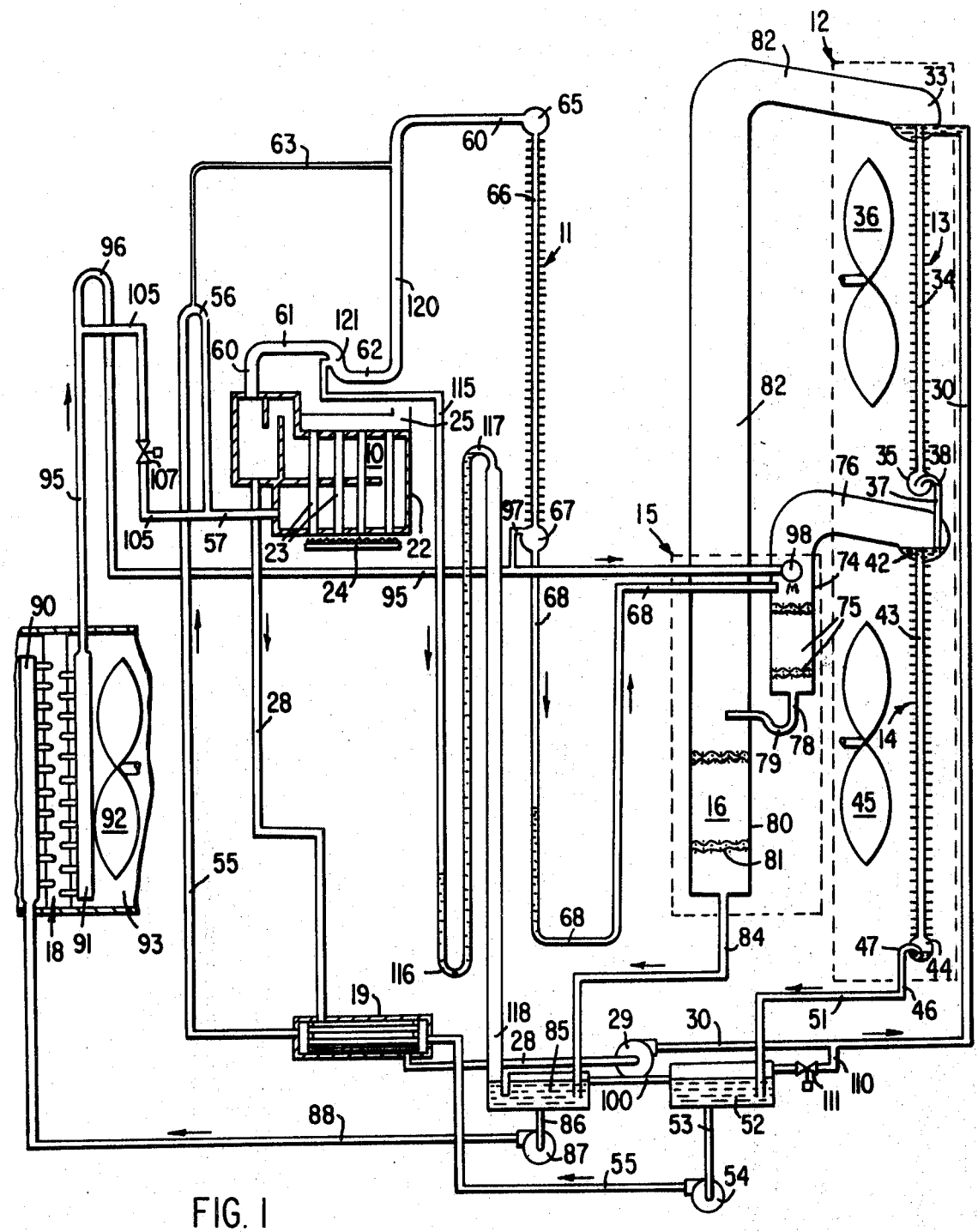
FIG. 1 is a schematic illustration, partly in cross-section, of a heating and cooling system having a trap in the refrigerant vapor passage in accordance with this invention.

This invention will be described with respect to a preferred embodiment wherein a two-stage adiabatic refrigerant evaporator and a two-stage air-cooled absorber are employed. However, this invention may be employed in systems having any number of either adiabatic or non-adiabatic evaporator stages.

The preferred refrigesant is water and the preferred absorbent is an aqueous solution of lithium bromide, although other absorbent-refrigerant combinations, especially those including a lithium halide salt, may be employed instead. As used herein, a concentrated solution of lithium bromide will be referred to as "strong" solution and a dilute solution of lithium bromide will be referred to as "weak" solution. "Refrigerant" as used herein includes pure water, which may be referred to as 'concentrated refrigerant," and water having lithium bromide therein, which may be referred to as "dilute refrigerant." A heat transfer promoting additive, such as 2-ethyl-n-hexanol, may be added to the absorbent solution.

Referring to the drawing, the system comprises a generator 10, a condenser 11, an absorber 12 having a low pressure stage 13 and a high pressure stage 14, an adiabatic evaporator 15 having a low temperature stage 16 and a high temperature stage 17, an air conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger.

Generator 10 comprises a shell 22 having a plurality of fire tubes 23 extending therethrough. Fuel burner 24 discharges hot gas through fire tubes 23 into flue gas collector 25. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low pressure vapor header 33 disposed at the top of low pressure absorber stage 13.

Low pressure absorber stage 13 comprises a plurality of vertically disposed finned absorber heat exchange tubes 34 connected at their upper ends by a low pressure vapor header 33 and at their lower ends by a low pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low pressure liquid header 35 is of intermediate concentration. The intermediate solution passes through siphon tube 37 having an upwardly arched portion 38 into high pressure vapor header 42 of high pressure absorber stage 14.

High pressure absorber stage 14 comprises a plurality of finned vertical absorber heat exchange tubes 43 joined at their upper ends by high pressure vapor header 42 and at their lower ends by high pressure liquid header 44. Intermediate absorbent solution overflows the upper open ends of absorber tubes 43 and passes downwardly along the interior surfaces of the absorber tubes while refrigerant vapor is being absorbed therein. The heat of the absorption process is rejected from high temperature absorber stage 14 to ambient air passed over the exterior surfaces of absorber tubes 43 by fan 45.

Absorbent solution passing downwardly through absorber tubes 43 is further diluted by the absorption of refrigerant vapor therein so that the absorbent solution collected in high pressure liquid header 44 is weak in absorbing power. The weak solution passes from the low pressure liquid header 44 through a siphon tube 46 having an upwardly arched portion 47 through weak solution passage 51 into weak solution sump 52. The weak solution then passes from weak solution sump 52 through weak solution passage 53 to weak solution pump 54. The weak solution is then pumped through weak solution passage 55 and the interior tubes of solution heat exchanger 19 through an upwardly extending loop 56, and weak solution passage 57 into generator 10 for reconcentration.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode. A vent line 63 vents the upper portion of loop 56 to the condenser pressure in passage 60.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensate formed in condenser 11 passes from header 67 through condensate passage 68 having a downwardly extending loop or trap 69 into high temperature evaporator stage 17 of adiabatic refrigerant evaporator 15.

High temperature evaporator stage 17 comprises a shell 74 having packing material 75 therein. A vapor passage 76 extends between high temperature evaporator stage 17 and vapor header 42 of high pressure absorber stage 14. A small quantity of refrigerant is evaporated from refrigerant passing through evaporator stage 17, thereby flash-cooling the remaining refrigerant. The cooled refrigerant passes from high temperature evaporator stage 17 to low temperature evaporator stage 16 through refrigerant passage 78 having a downwardly extending trap 79.

Low temperature evaporator stage 16 comprises a shell 80 having packing material 81 therein and a refrigerant vapor passage 82 communicating with vapor header 33 of low pressure absorber 13. As in the preceding stage, a small quantity of refrigerant is evaporated in low temperature evaporator stage 16 which results in flash-cooling the remainder of refrigerant passing therethrough. In all, only about one percent of the total refrigerant flowing through adiabatic evaporator 15 need be evaporated to satisfactorily flash-cool the remaining ninety-nine percent. A conventional single or multi-stage evaporator having a heat absorbing heat exchanger 18 included therein may be alternatively employed.

The cold refrigerant then passes from low temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air conditioning fan-coil unit having an inlet header 90, an outlet header 91 and a fan 92 for passing air to be conditioned through the fan-coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passage 95 having an upwardly extending loop 96 and restricted spray nozzle 98 back to high temperature evaporator stage 17 of adiabatic evaporator 15 for recooling of the refrigerant. Some refrigerant is bled through passage 97 into condensate header 67 to mix refrigerant with the condensate.

A refrigerant reconcentration and vapor pressure control passage 100 extends between sumps 85 and 52 as shown in the drawing. This passage serves to adjust the concentration and vapor pressure of refrigerant and absorbent solution in the system under various operating conditions as explained in Leonard application Ser. No. 784,724.

A heating passage 105 communicates with passage 95 at a point below the top of upwardly arched loop 96. A mode control valve 107 is disposed in passage 105 which communicates at its other end with generator 10 through passage 57. Another heating passage 110 having a mode control valve 111 therein communicates between discharge of solution passage 30 and absorbent sump 52. A third heating passage 115, which comprises a generator effluent passage, has an upper end connected between upwardly arched portion 61 and downwardly arched portion 62 of passage 60. Effluent passage 115 has a downwardly extending loop 116 and an upwardly extending loop 117 therein. The downward leg 118 of upwardly extending loop 117 is connected to refrigerant sump 85 and is of larger diameter than the legs of loop 116 to prevent siphoning of loop 116.

When the system is in the cooling mode of operation, mode control valves 107 and 111 are closed and the liquid levels are approximately as shown in the drawing. Loop 116 is filled with sufficient liquid to balance the pressure difference between generator 10 and refrigerant sump 85 to prevent passage of vapor therebetween. At or above design ambient absorber temperature, the refrigerant circulated through evaporator 15 and heat exchanger 18 is preferably substantially pure water and the strong absorbent solution concentration is preferably about 64.5 percent lithium bromide by weight.

To switch from the cooling mode of operation to the heating mode, control valves 107 and 111 are opened. Operation of pumps 54 and 29, and fans 36 and 45, is discontinued. Opening of valve 107 causes the fluid passing through passage 95 from heat exchanger 18 to be diverted into passage 105 because passage 105 and connecting passage 57 is below the top of loop 96 which is above the top of loop 61. Generator 10 and loops 61 and 62 are flooded with a mixture of refrigerant and absorbent solution by pump 87. The liquid level in passage 60 is below the junction of vent line 63 and below the top of loop 96. All of the refrigerant and absorbent solution in the system is mixed together to form a heating solution when the system is in the heating mode.

A major portion of the heated solution (90 percent) passes upwardly through loop 61 into passage 115. The level of the heated solution is above the level of upwardly extending loop 117 and it will flow by gravity through passage 115 through downwardly extending leg 118 into refrigerant sump 85. The heated solution passes from refrigerant sump 85 through the heat exchanger 18. A minor portion (10 percent) of the solution heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

When it is desired to terminate heating and return to the cooling mode of operation, mode control valves 107 and 111 are closed. Pumps 54 and 29, and fans 36 and 45 are again energized. Closing of valve 107 terminates direct flow of solution from heat exchanger 18 to generator 10. Instead, solution is pumped from heat exchanger 18, through upwardly extending loop 96 and passage 95, and serially through high temperature evaporator 17 and low temperature evaporator 16 of adiabatic evaporator 15. The solution in generator 10 is heated to the boiling temperature to concentrate the solution. The level of solution in the generator drops so that vapor passage 60 is free of liquid and loop 116 is sealed but no longer passes solution.

The quantity of refrigerant passing through evaporator 15 will increase due to the refrigerant added to the refrigerant circuit from condenser 11, and the level of refrigerant in sump 85 will tend to rise. When the head of refrigerant in sump 85 tends to exceed the head of absorbent solution in sump 52, diluted refrigerant will flow through refrigerant reconcentration and vapor pressure control line 100 into absorbent sump 52 to balance the liquid heads in the two sumps. At absorber ambient temperature above design conditions, diluted refrigerant will continue to be bled from sump 85 into sump 52 until the refrigerant has been substantially concentrated and the absorbent solution has been concentrated to the desired full-load design operating concentration.

If the temperature of air passed over absorber 12 is less than the design temperature, the process of concentrating the absorbent solution and the refrigerant will stop at some intermediate concentration where an equilibrium is reached between absorber capacity and refrigeration demand. From then on, the concentration of absorbent and refrigerant will adjust itself to provide a variable vapor pressure effect which just balances refrigeration load against absorber capacity.

In accordance with this invention, liquid trap 62 in refrigerant vapor passage 60 has a downstream leg 120 on the condenser side thereof with a substantially higher vertical elevation than that of its upstream or generator side leg 121. Passage 115 joins generator side leg 121 of trap 62 at a location substantially above and therefore remote from the bottom of the trap. The remote location of the junction of passage 115 and the generator side leg 121 assures liquid in trap 62 will remain in the bottom of the trap during heating mode operation and that this liquid will remain in a cold zone out of the fluid flow path of heated liquid heating medium passing from generator 10 to heat exchanger 18.

The condenser side leg 120 of trap 62 has a vertical elevation substantially above the height of loop 61 which includes generator side leg 121 of trap 62. The column of liquid heating medium in the condenser side leg 120 will balance any difference in pressure between generator 10 and condenser 11 when condenser 11 is exposed to a relatively low ambient air temperature. Condenser side leg 120 of trap 62 is preferably disposed in heat exchange relation with ambient air so as to cool the liquid heating medium therein sufficiently to provide a zone of liquid having a vapor pressure lower than the vapor pressure of liquid heated in the generator. Consequently, the liquid in the generator can be heated above the temperature at which it would boil, if exposed to condenser pressure, because of the lower vapor pressure of cold liquid in the trap 62 and because of the balancing head of liquid imposed by condenser side leg 120 of the trap.

The generator effluent passage comprises loop 61, which is a part of refrigerant vapor passage, and heating passage 115. Since the point of connection between heating passage 115 and the refrigerant passage 60 is remote from condenser side leg 120 and the bottom of trap 62, the liquid in trap 62 will remain in a relatively stagnant zone in the trap and out of the path of circulation of heated liquid passing through the heating passages. Any refrigerant escaping from trap 62 will tend to concentrate the solution in the trap and further increase its boiling point so as to prevent boiling of the heated liquid heating medium passing through the generator effluent passage to heat exchanger 18. The small amount of condensate, which is formed by slight boiling in trap 62, may be condensed in condenser 11 without seriously interfering with the heating mode operation as would be the case if cold, pressure balancing trap 62 were not present.

Upon switching from the heating to the cooling mode of operation, the level of solution in the generator drops and loop 61 is drained through heating passage 115. The solution in leg 120 of trap 62 is largely drained through passage 115 and the remainder is drained from the trap, by being blown through to the condenser.

Figure 2:
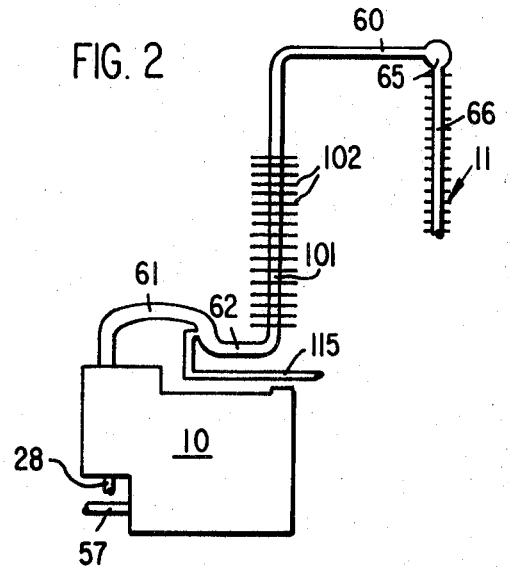
FIG. 2 illustrates a slightly modified liquid trap in a refrigerant vapor passage.

Referring particularly to FIG. 2, there is shown a slightly modified form of liquid trap 62. In this arrangement, the condenser side leg of trap 62 includes a heat exchanger vessel 101 having fins 102 thereon for more effective heat transfer with ambient air. Heating passage 115 is connected above the bottom of trap 62 to the generator side leg thereof. Fins 102 provide better cooling of the liquid in the condenser side leg of trap 62, thereby contributing to preventing boiling of heated heating medium. The condenser side leg forms a stagnant zone which is remote from and out of direct communication with the generator effluent passages 61, 115.

Figure 3:
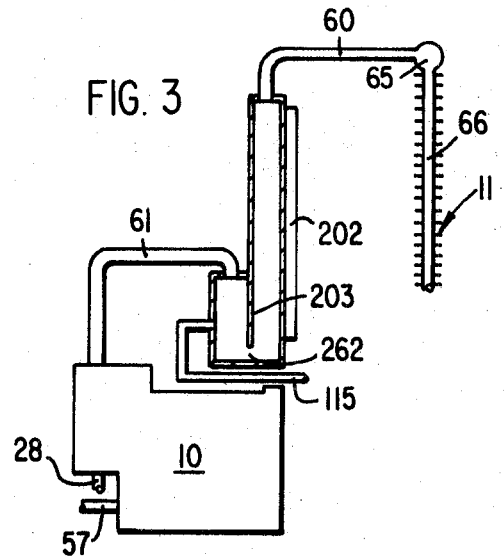
FIG. 3 illustrates a further modified liquid trap in a refrigerant vapor passage.

FIG. 3 shows a still further modified trap in refrigerant vapor passage 60. In this version, a partition 203 divides chamber 201 into a generator side leg and a condenser side leg of liquid trap 262. Vertical fins 202 are provided along the condenser side leg of trap 262 to cool the liquid heating medium therein. Trap 262 also may conveniently act as a separation chamber during heating mode operation and may be incorporated within the generator, if desired.

It will be seen that provision of a liquid trap in the refrigerant vapor passage in accordance with this invention makes it possible to provide an effective heating mode of operation, even when the system is physically located outdoors or is exposed to a low ambient temperature. The cold stagnant zone of liquid in the liquid trap, remote from the generator effluent passage, tends to prevent boiling and condensation in condenser 11 by imposing a liquid head on the generator and by creating a stagnant zone of liquid heating medium which is cooled below its boiling temperature and is out of direct communication with the effluent passage.

While the preferred embodiments of this invention have been illustrated and described, it will be appreciated that the invention may be otherwise embodied within the scope of the following claims.

I claim:
1. A heating and cooling system having a cooling mode of operation and a heating mode of operation;
   (A) said system in the cooling mode of operation comprising a generator for concentrating weak absorbent solution by boiling the weak solution and vaporizing refrigerant therefrom, a condenser for condensing refrigerant vaporized in the generator, an evaporator for evaporating refrigerant condensed in the condenser to provide cooling, and an absorber for absorbing refrigerant vapor formed in the evaporator into absorbent solution concentrated in the generator, said system including refrigerant vapor passage means extending from said generator to said condenser for passing refrigerant vapor from the generator, said system including refrigerant vapor passage means extending from said generator to said condenser for passing refrigerant vapor from the generator to the condenser for condensation therein;
   (B) said system in the heating mode of operation comprising heating passage means including generator effluent passage means for passing a heated liquid heating medium from the generator through a heat exchanger in heat exchanger relation with a heating load, and passage means for returning the heating medium to the generator for reheating therein;
wherein the improvement comprises:
   (C) said refrigerant vapor passage means including a liquid trap therein, said liquid trap preventing direct vapor communication between said generator and said condenser when said trap is flooded with liquid;
   (D) passage means for flooding said liquid trap with liquid during the heating mode of operation of said system;
   (E) said generator effluent passage means being connected to said generator at a location remote from said liquid trap so that heated liquid heating medium bypasses said liquid trap in passing from said generator to said heat exchanger and the liquid in said trap remains in a relatively stagnant zone at a lower vapor pressure than the heated heating medium in the generator, thereby inhibiting boiling of liquid in said trap to inhibit condensation of refrigerant vapor and loss of heat from said condenser during heating mode operation of said system; and
   (F) means for draining said liquid trap when said system is operating in the cooling mode to unblock said refrigerant vapor passage and provide direct vapor communication between said generator and said condenser.

2. A heating and cooling system as defined in claim 1 wherein the liquid trap in said refrigerant vapor passage has a condenser side leg and a generator side leg, said condenser side leg having a sufficiently greater elevation than said generator side leg so that any difference in pressure between the generator and the condenser may be balanced by the liquid in the condenser side leg of the trap during heating mode operation.

3. A heating and cooling system as defined in claim 1, wherein said liquid trap in the refrigerant vapor passage includes a generator side leg and a condenser side leg, said condenser side leg having a sufficiently greater elevation than said generator side leg so that any difference in pressure between said generator and said condenser may be balanced by the liquid in the condenser side leg of said trap during heating mode operation; said relatively stagnant zone comprising said condenser side leg; and said condenser side leg being in heat exchange relation with ambient air for cooling the liquid therein to a lower temperature than the heated heating medium in said generator.

4. A heating and cooling system as defined in claim 1 wherein said effluent passage joins said refrigerant vapor passage on the generator side of the liquid trap in said refrigerant vapor passage at a location having an elevation above the bottom of said trap, whereby a portion of said refrigerant vapor passage is utilized for passing heated heating medium from the generator toward said heat exchanger in the heating mode of operation and another portion of said refrigerant vapor passage forms said liquid trap at a location therein which is relatively remote from the flow path of heated heating medium passing from the generator to the heat exchanger.

5. A heating and cooling system as defined in claim 1 wherein the means for flooding said liquid trap with liquid comprising means for flooding said liquid trap with liquid heating medum.

6. A heating and cooling system as defined in claim 1 wherein said liquid trap in said refrigerant vapor passage is in heat exchange relation with ambient air for cooling the liquid in said trap below the temperature of heated medum in the generator.

7. A heating and cooling system as defined in claim 1 wherein the means for flooding the liquid trap with liquid comprises flooding the liquid trap with liquid heating medium; said system including means for cooling the liquid in said liquid trap below the temperature of the heated heating medium in the generator in order to maintain the vapor pressure of the liquid in said trap below the vapor pressure of the heated heating medium in the generator, thereby inhibiting vaporization of refrigerant from the liquid in said trap; and said liquid trap having a generator side leg and a condenser side leg, said condenser side leg having an elevation sufficiently greater than said generator side leg so that any pressure difference between said generator and said condenser may be balanced by liquid heating medium in said condenser side leg during heating mode operation.

8. A method of operating a heating and cooling system wherein said system in the cooling mode comprises a generator for concentrating absorbent solution by boiling the solution and vaporizing refrigerant therefrom, a condenser for condensing refrigerant vapor formed in the generator, an evaporator for providing cooling by evaporating refrigerant condensed in the condenser, and an absorber for absorbing refrigerant vapor formed in the absorber into absorbent solution concentrated in the generator, said system including a refrigerant vapor passage for passing refrigerant vapor from said generator to said condenser; and wherein said system in the heating mode of operation comprises heating passage means for passing a heated heating medium from the generator through a heat exchanger in heat exchange relation with a heating load, and means for returning the heating medium to the generator for reheating therein; wherein the improvement comprises the steps of:
   (A) forming a liquid trap in the refrigerant vapor passage between the generator and the condenser when operating said system in the heating mode by flooding a region in said refrigerant vapor passage with liquid;

(B) passing heating medium from said generator to said heat exchanger through said heating passage while bypassing the liquid trap in the refrigerant vapor passage so that the liquid in said trap remains out of circulation, thereby forming a relatively stagnant zone in said refrigerant vapor passage;

(C) maintaining the vapor pressure of the liquid in said trap lower than the vapor pressure of the heated heating medium in said generator so that boiling of the liquid in the trap and condensation of refrigerant in said condenser is inhibited during the heating mode of operation; and (D) draining said liquid trap upon switching said system from the heating to the cooling mode of operation, thereby opening the refrigerant vapor passage for direct communication between said generator and said condenser.

9. A method of operating a heating and cooling system as defined in claim 8 which includes the step of balancing any difference in pressure between said condenser and said generator by forming a liquid column in the condenser side of the liquid trap sufficient to balance any pressure difference between the generator and the condener during heating mode operation of the system.

10. A method of operating a heating and cooling system as defined in claim 8 wherein the step of forming the liquid trap by flooding it with liquid comprises flooding the liquid trap with liquid heating medium.

11. A method of operatng a heating and cooling system as defined in claim 8 wherein the step of forming the liquid trap by flooding it with liquid comprises raising the level of the liquid heating medium in the generator sufficiently to flood the liquid trap with liquid heating medium.

12. A method of operating a heating and cooling system as defined in claim 8 wherein the step of maintaining the vapor pressure of the liquid in said trap lower than the vapor pressure of the heated heating medium in said generator comprises cooling the liquid in said liquid trap to a temperature sufficient for maintaining said liquid at a lower vapor pressure than the vapor pressure of the heating medium in the generator.

13. A method of operating a heating and cooling system as defined in claim 8;

(A) wherein the step of forming the liquid trap in the refrigerant vapor passage by flooding it with liquid comprises flooding the liquid trap with liquid heating medium;

(B) said step of maintaining the vapor pressure of the liquid in said trap lower than the vapor pressure of heating medium in the generator comprises cooling the liquid heating medium in the liquid trap; and (C) said method includes the step of balancing any pressure difference between said generator and said condenser during heating mode operation by forming a column of liquid heating medium in the condenser side leg of said liquid trap sufficient to balance the difference in pressure.

14. A method of operating a heating and cooling system as defined in claim 8 wherein the step of forming the liquid trap in the refrigerant vapor passage by flooding it with liquid comprises flooding the liquid trap with liquid heating medium and said step of maintaining the vapor pressure of the liquid in said trap lower than the vapor pressure of heating medium in the generator comprises cooling the liquid heating medium in the liquid trap below the temperature to which the heating medium in the generator is heated.

References Cited

UNITED STATES PATENTS 3,153,441  10/1964  Pippert et al. _____ 165—62 X

WILLIAM E. WAYNER, Primary Examiner

U.S. Cl. X.R.

62—497